United States Patent [19]

Rush

[11] 4,178,041
[45] Dec. 11, 1979

[54] WHEEL ATTACHED BALANCING DEVICE
[75] Inventor: Kim E. Rush, Irvine, Calif.
[73] Assignee: Khartli, Inc., Danville, Calif.
[21] Appl. No.: 935,885
[22] Filed: Aug. 23, 1978
[51] Int. Cl.² .......................... B60B 7/00; F16F 15/10
[52] U.S. Cl. ............................... 301/5 BA; 74/573 R; 74/574; 188/218 A; 301/37 R
[58] Field of Search .................. 301/5 B, 5 BA, 37 R, 301/37 TP, 37 S, 37 SC, 37 B, 41 W; 74/573 R, 573 F, 574; 188/218 A; 295/7

[56] References Cited
U.S. PATENT DOCUMENTS 2,895,766  7/1959  Leopold ............................ 301/5 BA
4,070,922  1/1978  Wyman ............................. 74/573 R

FOREIGN PATENT DOCUMENTS 2543203  3/1977  Fed. Rep. of Germany ............. 74/573

Primary Examiner—H. Grant Skaggs
Attorney, Agent, or Firm—William C. Babcock

[57]  ABSTRACT

A wheel balancing device for permanent wheel attachment. A rim of the device acts on the wheel periphery to confine same against vibrational movement. A hub and conical disc when acted on by centrifugal force during wheel rotation move axially toward the wheel to radially load the rim and displace same into forceful contact with the wheel periphery.

10 Claims, 10 Drawing Figures

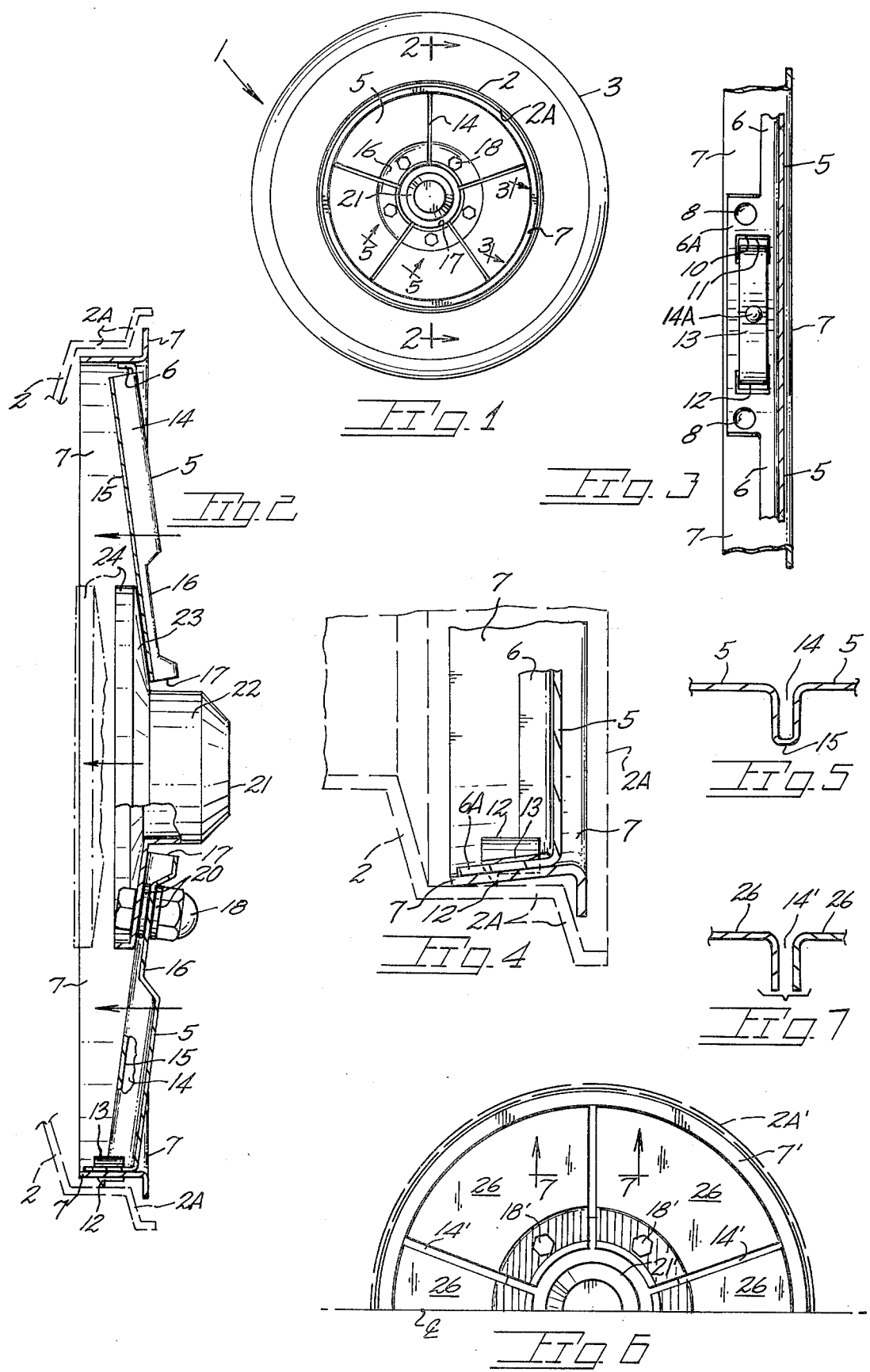

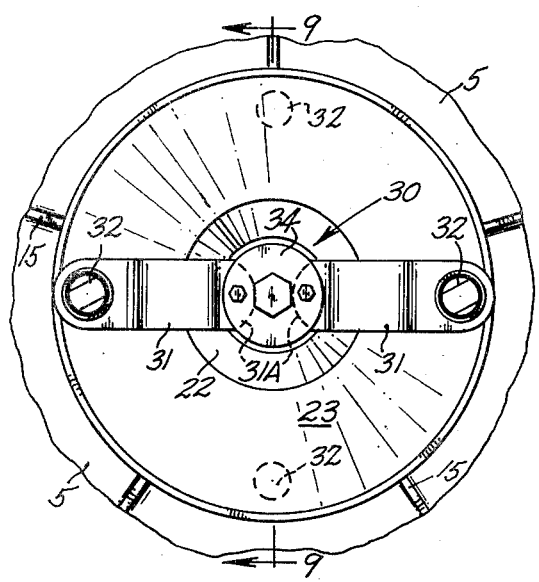
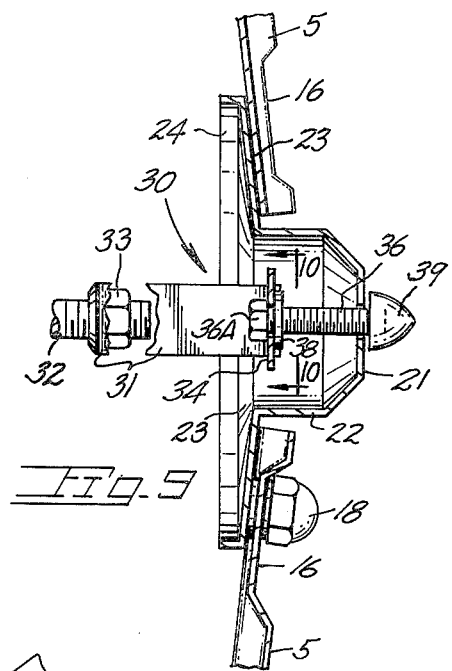
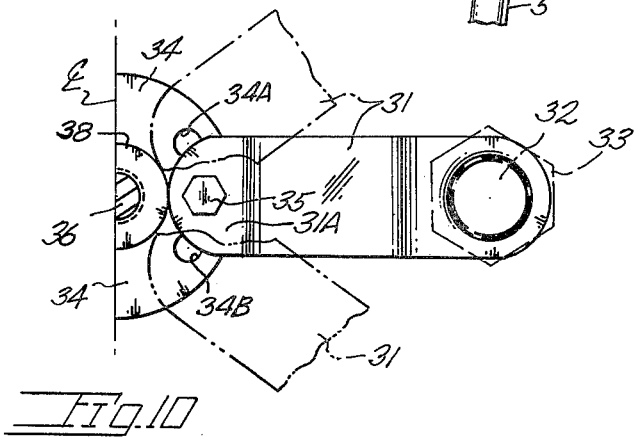

WHEEL ATTACHED BALANCING DEVICE

BACKGROUND OF THE INVENTION

The present invention concerns a wheel balancing device for permanent attachment to an automotive wheel.

A substantial amount of wear imparted to the tires, suspension components and steering linkage of a vehicle is attributable to a wheel or wheels being out of balance. While improvements in wheel balancing equipment and technique have contributed to the solving of vibration problems, a substantial amount of vibration may in fact occur in an apparently balanced wheel without being discernable by the operator. The cumulative effect of such vibration over the many miles driven can be premature wear resulting in costly repair and replacement of same and may result in an unsafe condition of the auto until remedied. Loss of a wheel weight affixed to the wheel rim in the customary manner can result in severe wear unless detected by the operator and the wheel and tire re-balanced.

Also affected by an out of balance condition of a wheel or wheels is the stopping or braking capability of an automobile. Braking, particularly at high speed, can result in the coefficient of friction varying between the tire surface and pavement through one revolution of a wheel assembly which if severe can initiate loss of traction and an increase in the automobile's stopping distance. Further, a variance in frictional contact between each of the forward or the rearward pairs of vehicle wheels can impart asymmetrical braking forces to the vehicle resulting in swerving of the automobile.

While automotive wheel balancing equipment, if properly used at regular intervals, can largely reduce wear due to wheel vibration, such is not as a practical matter the normal practice. Automobile owners as a general rule disregard regular balancing of tires and limits same to being done when a new or repaired tire is mounted to the automobile wheel or when a wheel assembly becomes noticeably out of balance.

SUMMARY OF THE PRESENT INVENTION

The present invention is embodied within a device having certain dynamic characteristics which are imparted to a rotating wheel to inhibit vibratory motion of same.

The present device may generally resemble a wheel cover and may likewise contribute to the appearance of a wheel assembly but is primarily intended to remedy undesired vibratory motion of a rotating wheel assembly consisting of the tire and metal wheel. A wheel cover hub of the present device is disposed coaxial with the wheel assembly axis by means of a disc, or sectors in a modified form of the invention, such being of a flexible nature permitting dynamic displacement of the hub and disc toward and away from the wheel assembly. The disc mounts at its outer periphery, a rim adapted with gripper teeth for retentive engagement with the outermost shoulder of a wheel. During wheel rotation, said rim flexes radially into biasing contact with the wheel to impart a uniform, radially directed centrifugal load thereagainst. The rim, while in such biased contact with the wheel, serves to dampen or terminate vibratory motion imparted to the wheel assembly by reason of same or the tire being thereon being or having an inherent unbalanced condition. Inward movement of the hub of the device imparts likewise movement in the flexible disc or spokes by reason of centrifugal force being translated into hub movement. Further, the weight of the present device acts in a gyroscopic manner to stabilize an automobile wheel assembly.

Important objectives of the present invention include the provision of a balancing device for automotive wheels and the like said device having a hub portion displaceable inwardly along the wheel axis during wheel rotation to uniformly load the wheel about its outer peripheral shoulder to counteract asymmetrical loads imparted to the wheel by reason of an out of balance wheel condition; the provision of a device including flexible disc or spoke components disposed intermediate a hub and a rim which are displaced inwardly during wheel rotation to bias the automobile wheel periphery with the flexible disc or spoke components terminating outwardly in securement with an expansible wheel cover rim the latter centrifugally loading the wheel assembly at virtually all rotational speeds; the provision of a device serving to impart a balanced condition to an automobile wheel and tire thereon thereby dispensing with periodic balance of automobile tires and wheels at considerable savings to the automobile owner; the provision of a balancing device which functions to dampen out virtually all vibratory motion of an automobile wheel assembly to substantially reduce tire wear and wear on suspension and steering components; the provision of a balancing device comprising a wheel cover hub with a flexible disc or, alternatively a plurality of sector shaped components extending intermediate the hub and the rim of the device and serving to radially displace said rim urging same into contact with the automobile wheel; the provision of a wheel cover having vibration dampening attributes additionally including bolted retention means assuring against accidental separation of the present device from the automobile wheel.

BRIEF DESCRIPTION OF THE DRAWING

In the accompanying drawings:

FIG. 1 is a side elevational view of an automobile wheel assembly viewed from its outer side and having the present device in place thereon;

FIG. 2 is a sectional view taken substantially along line 2—2 of FIG. 1 and showing details of the device;

FIG. 3 is a sectional view taken along line 3—3 of FIG. 1 showing means for attaching the balancing device to a wheel;

FIG. 4 is a fragmentary sectional view of the rim of the device displaced outwardly into vibration dampening contact with automobile wheel shown in fragmentary form in phantom lines;

FIG. 5 is a sectional view taken along lines 5—5 of FIG. 1 showing details of flexible disc construction;

FIG. 6 is an elevational view of the device broken away along a horizontal radial plane;

FIG. 7 is a sectional view taken along line 7—7 of FIG. 6 showing flexible spoke construction;

FIG. 8 is a fragmentary elevational view of retainer means for the device as viewed from the wheel side of the device;

FIG. 9 is a sectional view taken along line 9—9 of FIG. 8 showing details of the retainer means; and FIG. 10 is a sectional view taken along line 10—10 of FIG. 9 showing further details of the retention means broken away along the vertical center line thereof.

DETAILED DESCRIPTION OF THE PREFERRED EMBODIMENTS

With continuing attention to the accompanying drawings, the reference numeral 1 indicates generally a wheel assembly consisting of a metal wheel 2 and tire 3. While the present invention is described in conjunction with a vehicle wheel such is not to be construed as a limitation since the present balancing device is also advantageously used on other wheel assemblies.

The automotive type wheel is indicated at 2 and is typically shouldered at 2A for tire bead retention.

Shown in place on wheel 2 in FIG. 3 is a metal disc 5 generally conical in shape and having a perimetrical flange 6. Said flange is enlarged at spaced intervals as at 6A (FIG. 3) and thereat in securement with a rim 7 as by spot welds at 8. Corresponding openings 10 and 11 in flange portions 6A and the rim serve to admit gripper teeth 12 which may be interconnected by a flexible intermediate segment 13 secured in place by a rivet 14A. As viewed in FIG. 2, the gripper teeth 12 may flex inwardly as their pointed ends come into biased engagement with wheel shoulder 2A during mounting of the device.

With attention again to disc 5, the same is configured so as to define radiating grooves 14 closed by webs 15 (FIG. 5). An annular recessed area of the disc is indicated at 16 with other such areas (not shown) provided primarily for aesthetic purposes. Webs 15 of disc 5 are flexible by reason of a reduced wall thickness which may be approximately 0.032 inches. The disc is of steel approximately 0.048 inches with apertures formed adjacent the disc's inner periphery 17 for the reception of fastener assemblies 18. Non-metallic spacers at 20 isolate the metallic disc from the outer surface of a skirt portion 23 of a hub 21. Disc 5 defines openings intermediate pairs of grooves 14 for valve stem access and brake cooling purposes.

Hub 21 includes a central portion, the conical skirt 23 integral therewith and an annular wall 24. Conical skirt 23 has an outer or disc facing surface in the shape of a truncated cone with a taper of approximately six degrees relative a plane normal to the wheel assembly axis. The skirt is apertured to receive the bolts of fastener assemblies 18 which attach disc 5 which also is of like conical shape.

In view of the hub and disc shapes it will be seen that the mass of the balancing device is offset outwardly, or to the right in FIG. 2, from a circular line of contact between the disc flange 6 and rim 7.

In one practical embodiment of the present wheel cover, the hub 21 and rim 7 are formed from steel having a thickness of 0.048 inches.

In a static condition, the rim 7 is of a size to fit within that area proximate shoulder 2A of automotive wheel 2 with a clearance of about 0.250 inches or less.

With attention now to FIGS. 6 and 7, a modified wheel cover is illustrated wherein the unitary disc 5 has been dispensed with and instead, a series of sectors 26 support a hub 21'. The web at 15 in the first described form of the invention is dispensed with as indicated by a comparison of FIG. 5 with FIG. 7. The remaining details of the modified wheel cover remain as earlier described with like parts being indicated by prime reference numerals.

In some uses of the present balancing attachment where the wheel to which the attachment is applied is subject to severe impacts and strains it may be desired to employ a retainer assembly. Such assembly also enables installation of the present device on wheels not of ordinary or "stock" configuration such as those termed "deep dish" wheels and characterized by having a wheel hub portion axially offset an extreme distance from the wheel vertical centerline.

As viewed in FIGS. 8, 9 and 10, the retainer assembly, indicated generally at 30, is of spider configuration having angular legs at 31 for securement at their turned outer ends to wheel lugs 32 by means of lug nuts 33. Said legs converge outwardly along the wheel axis and are formed with a lip 31A for attachment to a plate 34. Said plate is apertured at 34A–34B to permit alternate attachment of a leg 31 to permit installation of the retainer assembly on five bolt wheels wherein the wheel lugs are not diametric. A fastener at 35 connects each leg to plate 34. Carried by plate 34 in an adjustable and lockable manner is a hub retainer 36 in the form of a headed fastener having an enlarged head 36A and a threaded shank in locked threaded engagement with a plate 34 which includes a threaded fastener element 38. The hub 21 is centrally apertured to receive retainer 36 with hub axial movement, as later explained, permitted intermediate the retainer extremities. A nut 39 limits hub outward movement in case of separation of the device from a wheel.

Operation of the present device results from centrifugal forces during vehicle travel. The expansible means disclosed as a continuous rim, when static, is disposed adjacent a circular outer portion of the wheel. Wheel rotation during vehicle travel results in the present device being subjected to centrifugal force acting along vectors perpendicular to the wheel axis. Conical disc 5, or the inclined flexible sectors in the modified form of the invention, tend to move toward a plane normal to the wheel axis. Radially exerted loading of rim 7 by said disc (or sectors) results in said rim uniformly expanding according to its modulus of elasticity and loading the circular wheel area to oppose vibratory motion of the wheel assembly otherwise occurring from the unbalanced condition of the wheel.

A more detailed analytic description also entails the flexures of disc 5. More specifically, as set forth above, disc 5 is separated into a plurality of radial sectors by the radiating grooves 14. In the first embodiment the reduced thickness of web 15 allows for relative flexure of the sectors while in the second embodiment the sectors 26 are separated by the radial slots 14' (FIG. 7) and are therefore free to flex independent and/or relative to each other. Thus, in both implementations either a weak spring or no spring at all is used to join the sectors. The sectors appear to behave, therefore, as dynamically independent structural members tied at the center to the hub 21 and retained at the outer periphery by the cantelevered enlargements 6A of the flange 6. Each of the sectors being substantially triangular will have its center of mass radially outward of its half-way point of the sector radius. Furthermore, the sector center of mass is axially outboard off the plane extending through the attachments thereof to the rim 7 and with centrifugal loading outward collapse of the cantelevered flange enlargements 6A cumulates with the elastic hoop expansion of the rim to collapse the cone of the disc 5 even after full expansion of the rim.

It is to be noted that statically the cone angle of the disc 5 (or of sectors 26) is about 6 degrees. The ratio of inward collapse with radial expansion is therefore substantially equal to the ratio of the cosine of 6° to the sine of 6°. Thus, only small radial changes are necessary to axially collapse the cone.

The foregoing collapse is predicated on ideal conditions. In case of shifting of the instantaneous center of rotation, as often occurs because of wheel unbalance, this sine-cosine relationship and the effectively uncoupled sector structure provide additional benefits. Specifically, it is noted that the sector aligned with the wheel unbalance, i.e., the sector closest to the heavy point on the wheel, experiences the highest centrifugal loading. The radial pull of this sector will therefore be greater than that of the sector(s) diametrically opposite. Thus an assymetrically loaded elastic disc structure results which, because of the gyroscopic effects present will tend to relieve itself to align the major axis of inertia with the wheel spindle axis. This relief is achieved by an overcompensating tilt of the hub 21.

While a rigorous treatment of the dynamics of motion of this elastic body are beyond the capabilities of the applicant, the observed results support the foregoing generalized model. Specifically, it has been found that the usual unbalance resonance at 55-65 miles per hour does not occur with these wheel covers even after all conventional balancing weights have been removed. Furthermore, visual observations of the hub 21, at speed, indicate a complex mutation - precission motion of a frequency substantially higher than that of the wheel. The superposition of this higher frequency loading appears to substantially improve rolling friction and therefore gas mileage which is particularly important in view of the present gasoline shortage.

While I have shown but a few embodiments of the invention it will be apparent to those skilled in the art that the invention may be embodied still otherwise without departing from the spirt and scope of the invention.

Having thus described the invention, what is desired to be secured under a Letters Patent is:

I claim:

1. A wheel attachable balancing device comprising in combination, radially expansible means for disposition proximate a circular portion of a wheel and radially displaceable during wheel rotation into engagement with said circular portion, a hub, hub support structure carried by said expansible means and locating said hub in coaxial offset relationship with said expansible means, the entire body of said hub being axially displaceable during wheel rotation by centrifugal force acting on said support structure, said support structure biasing said radially expansible means during wheel rotation into contact with the circular portion of the rim to counteract vibratory wheel motion.

2. The device claimed in claim 1 wherein said expansible means is a continuous rim radially expansible into wheel contact.

3. The device claimed in claim 2 wherein said rim carries wheel engaging spring biased teeth adapted to provide wheel contact.

4. The device claimed in claim 1 wherein said support structure is of conical configuration.

5. The device claimed in claim 4 wherein said support structure is segmented and comprised of individual sector shaped members.

6. The device claimed in claim 1 wherein said support structure is of conical configuration, said hub and said support structure moving toward a plane containing the expansible means during wheel rotation to bias same radially into wheel contact.

7. The device claimed in claim 6 additionally including a retainer assembly including a spider attachable to the wheel lug bolts and including a retainer to confine the hub against lateral movement in the event of separation of the present device from a wheel.

8. The device claimed in claim 7 wherein said retainer assembly includes a retainer plate and a plurality of spider arms.

9. The device claimed in claim 8 wherein said retainer plate is adapted to mount a variable number of legs to accommodate attachment to both four and five lug bolt wheels.

10. The device claimed in claim 8 wherein said retainer assembly includes a retainer extending outwardly past the hub.

* * * * *